(12) United States Patent
Benesch (10) Patent No.: US 7,983,060 B2
(45) Date of Patent: Jul. 19, 2011

(54) METHOD FOR REDUCING THE REACTIVE POWER REQUIREMENT OF A FUNDAMENTAL FREQUENCY CLOCKED POWER SUPPLY SIDE CONVERTER UNDER NO LOAD AND WITH LOW MOTOR LOADING

(75) Inventor: Norbert Benesch, Heroldsberg (DE)

(73) Assignee: Siemens Aktiengesellschaft, München (DE)

( * ) Notice: Subject to any disclaimer, the term of this patent is extended or adjusted under 35 U.S.C. 154(b) by 477 days.

(21) Appl. No.: 12/295,127

(22) PCT Filed: Feb. 21, 2007

(86) PCT No.: PCT/EP2007/051636
§ 371 (c)(1),
(2), (4) Date: Sep. 29, 2008

(87) PCT Pub. No.: WO2007/113051
PCT Pub. Date: Oct. 11, 2007

(65) Prior Publication Data
US 2009/0278511 A1    Nov. 12, 2009

(30) Foreign Application Priority Data
Mar. 31, 2006   (DE) .......................... 10 2006 015 031

(51) Int. Cl.
*H02M 3/45* (2006.01)
(52) U.S. Cl. ............................. 363/37; 363/34; 318/811
(58) Field of Classification Search .............. 363/34–39, 363/40, 41, 43, 98, 89, 21.05, 20, 26; 323/222, 323/210, 225; 318/758, 759, 810–811, 807, 318/729, 438, 801
See application file for complete search history.

(56) References Cited

U.S. PATENT DOCUMENTS

| | | | | |
|---|---|---|---|---|
| 3,662,247 A * | 5/1972 | Schieman | ........................ | 363/41 |
| 4,384,321 A * | 5/1983 | Rippel | ........................... | 363/124 |
| 5,990,654 A * | 11/1999 | Skibinski et al. | ............. | 318/800 |
| 6,295,215 B1 * | 9/2001 | Faria et al. | ...................... | 363/37 |
| 6,567,283 B2 * | 5/2003 | Welches | .......................... | 363/89 |
| 7,148,651 B2 * | 12/2006 | Tobari et al. | ................... | 318/802 |
| 7,746,675 B2 * | 6/2010 | Wang et al. | ..................... | 363/44 |

FOREIGN PATENT DOCUMENTS

| | | |
|---|---|---|
| DE | 4208114 A1 | 9/1992 |
| DE | 69110966 T2 | 11/1995 |
| DE | 19617048 C1 | 7/1997 |
| EP | 0078923 B1 | 1/1986 |
| EP | 0353569 A2 | 2/1990 |
| WO | WO 9917435 A1 | 4/1999 |

* cited by examiner

*Primary Examiner* — Rajnikant B Patel
(74) *Attorney, Agent, or Firm* — Henry M. Feiereisen; Ursula B. Day (57) ABSTRACT

The invention relates to a method for reducing the idle current requirement of a base frequency clocked supply side converter (1) on idle and with low motor loads, provided with controllable semiconductors (T1,T2,T3,T4, T5,T6), wherein the base frequency clocking of the semiconductor switches (T1,T2,T3,T4,T5,T6) occurs depending on the desired direction of flow of power. A converter (1) for carrying out said method is also disclosed.

11 Claims, 4 Drawing Sheets

METHOD FOR REDUCING THE REACTIVE POWER REQUIREMENT OF A FUNDAMENTAL FREQUENCY CLOCKED POWER SUPPLY SIDE CONVERTER UNDER NO LOAD AND WITH LOW MOTOR LOADING

The invention relates to a method for reducing the reactive power requirement of a fundamental frequency clocked power supply side converter under no load and with low motor loading.

Electrical installations which, from the standpoint of the three-phase power supply, operate as load at times and as generator at times are usually connected to the three-phase power supply via a so-called intermediate circuit. One example of such an electrical installation is a centrifuge in a sugar factory. Installations operated in particular only occasionally and serving for decentralized electrical energy generation, such as relatively small wind power or solar installations, for instance, are likewise connected to the three-phase power supply via an intermediate circuit.

Figure 1:
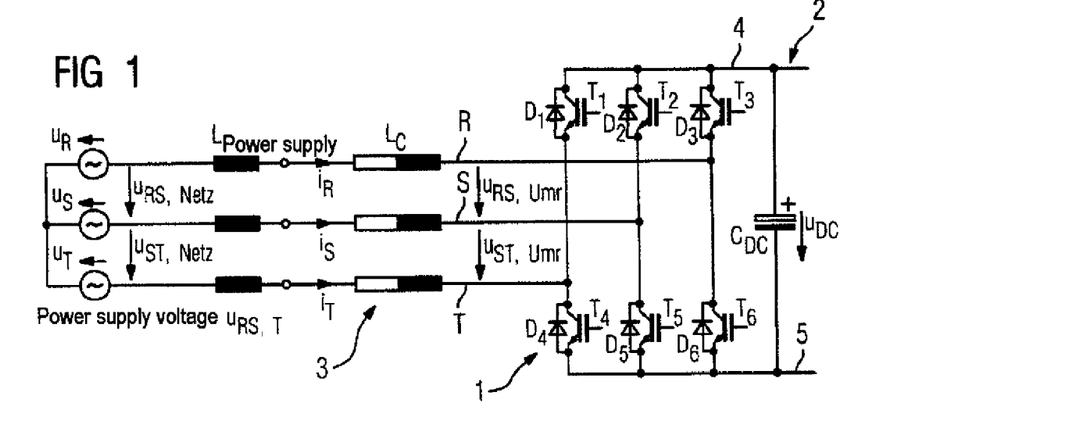
FIG. 1 shows a schematic illustration of a circuit of a fundamental frequency clocked converter connected to a three-phase power supply and serving for regulating an intermediate circuit in accordance with the prior art.

FIG. 1 schematically illustrates the construction and also the connection of a known converter 1 regulating an intermediate circuit 2 to a three-phase power supply 3. The converter 1 comprises a plurality of semiconductor switches $T_1, \ldots, T_6$ which are embodied as transistors or thyristors, for example, and which are each arranged between a line R, S, T of the three-phase power supply 3 and a line 4, 5 with the intermediate circuit 2. The lines R, S, T of the three-phase power supply are also referred to as phase R, S, T. The arrangement of the six semiconductor switches $T_1, \ldots, T_6$ illustrated in FIG. 1 is referred to as a six-pulse bridge circuit, B 6 bridge for short. The designation three-phase is also customary instead of the designation six-pulse. An intermediate circuit voltage $u_{DC}$ is present at the intermediate circuit 2. The intermediate circuit voltage $u_{DC}$ is a DC voltage. For buffering and smoothing the DC voltage, an intermediate circuit capacitance $C_{DC}$ is arranged between the lines 4, 5 having different electrical potentials.

Commutation inductors $L_C$ are arranged in the individual lines 4, 5, 6 between three-phase power supply 3 and intermediate circuit 2.

In fundamental frequency operation, the switching edges of the semiconductor switches are at the natural triggering instants, that is to say the points of intersection of the power supply voltages $u_{R,S,T}$ of the individual lines R, S, T of the three-phase power supply 2.

The fundamental frequency clocked operation of converters is distinguished by some advantages which make them expedient to use. Since high frequency clocking of the semiconductor switches, which can also be referred to as current valves, is not effected, this gives rise for example to low switching losses, the possibility of using simple and cost-effective commutation inductors and power supply filters, little excitation of system oscillations which can lead for example to high motor bearing currents.

Moreover, the intermediate circuit voltage $u_{dc}$ is lower than during regulated operation with a step-up converter. Complying with $u_{dc}$ limits is important e.g. for the insulation of motors connected to the intermediate circuit.

A considerable disadvantage of fundamental frequency clocked operation, however, is that during no load or during weak loading of the converter, a relatively large reactive power requirement arises and a high oscillating current occurs. The current and voltage profiles for such a case are illustrated schematically in FIG. 2. This leads to a loading of the electrical power supply for the user and to an apparently higher current consumption in association with the resultant disadvantages with regard to the energy costs.

One way of eliminating this disadvantage has hitherto been achieved on the one hand by using large commutation inductances $L_C$, associated with high costs for the commutation inductances $L_C$ and also a high voltage drop in the commutation inductances $L_C$. On the other hand, a small intermediate circuit capacitance $C_{DC}$ is used, associated with a small or even lacking buffer effect, as a result of which it is not possible to connect large multi-axle drives, for example, to the intermediate circuit.

If neither large commutation inductances nor small intermediate circuit capacitances are appropriate, the user hitherto has had to accept the high apparent power requirement in conjunction with the high costs arising as a result.

SUMMARY OF THE INVENTION

Therefore, it can be regarded as an object of the invention to specify a method with which the reactive power requirement of a fundamental frequency clocked current rectifier under no load or with weak motor loading can be reduced, with the aim of lowering the apparent power requirement under no load at least approximately to zero. According to one aspect of the invention, this object is achieved by means of a method for reducing the reactive power requirement of a fundamental frequency clocked power supply side converter, equipped with controllable semiconductor switches, under no load and with no motor loading, wherein the fundamental frequency clocking of the semiconductors switches is effected depending on the desire direction of the power flow. According to another aspect of the invention, this object is achieved by means of converter including controllable semiconductor switches for carrying out the method, characterized by means for continuously detecting and/or determining the direction of an instantaneous power flow, means for comparing the direction of the detected and/pr determined power flow with a desired direction of the power flow, and means for stating and stopping the fundamental frequency clocking of the semiconductor switches in a manner dependent on the desired direction of the power flow.

In a method according to the invention of the generic type mentioned in the introduction, the disadvantages of the prior art are avoided by virtue of the fact that the fundamental frequency clocking of the semiconductor switches is effected depending on the desired direction of the power flow.

The term fundamental frequency clocking encompasses a clocking of the individual semiconductor switches in a manner such that they are driven in each case in their individual angular ranges, segments, or the like, provided during fundamental frequency clocking, permanently, for example by driving with a direct-current switching signal, or at least predominantly, for example by driving with a high-frequency switching signal.

For carrying out the method according to the invention, use is preferably made of a converter circuit which enables both an active feeding-in/feedback power flow and purely passive operation in a line direction. A preferred circuit is an IGBT B6 bridge (insulated gate bipolar transistor) comprising a passive parallel diode bridge.

According to the invention, the IGBTs preferably used for the power flow from the intermediate circuit into the three-phase power supply are driven, in principle, only when active power is actually intended to be fed into the three-phase power supply. According to the invention, the fundamental frequency clocking of the semiconductor switches preferably embodied as IGBTs is thus dependent on the desired direction of the power flow.

The method according to the invention has the following advantages over the prior art:
- energy saving and hence cost saving for the user.
- Advantageous effect on the dimensioning of the power supply connection for the user and hence a cost saving.
- Improvement of the acceptance of the fundamental frequency operation for the user.
- On average reduced thermal loading of the converter and the additional components.
- No increase in the switching frequency of the semiconductor switches necessary for the test signal operation.
- Cost-effective realization possible since no additional components and no additional manufacturing outlay are required in comparison with the prior art.

What is more, the method according to the invention is compatible with the previous implementation of the fundamental frequency operation.

The manner of determining the desired direction of the power flow and thus the precise fashioning of the criteria for switching the fundamental frequency clocking on and off are dependent on the various system components.

By way of example, if use is made of a sensor system for power supply voltage, intermediate circuit voltage and also power supply and/or intermediate circuit current, then it is conceivable to carry out the method according to the invention as follows:
- continuously measuring the power supply voltages $u_{R,S,T}$ of a three-phase power supply connected to the converter,
- continuously measuring the intermediate circuit voltage $u_{DC}$ of an intermediate circuit connected to the converter,
- continuously determining and observing at least one line-to-line power supply voltage $u_v$ on the basis of the measured power supply voltages $u_R$, $u_S$, $u_T$,
- continuously determining and observing a power supply active current $I_w$, for example on the basis of the measured voltages,
- continuously determining and observing a smoothed mean value $\bar{I}_w$ of the power supply active current $I_w$,
- continuously determining and observing the difference $\Delta u$ between intermediate circuit voltage $u_{DC}$ and line-to-line power supply voltage $u_v$ in accordance with $$\Delta u = u_{DC} - u_v$$

- comparing the difference $\Delta u$ with a positive threshold value $\Delta u_{lim}$, and
- starting the fundamental frequency clocking of the semiconductor switches if the difference $\Delta u$ exceeds the threshold value $\Delta u_{lim}$, and
- stopping the fundamental frequency clocking of the semiconductor switches if the smoothed mean value $\bar{I}_w$ of the power supply active current $I_w$ changes its sign.

The line-to-line power supply voltages $u_v$ under consideration correspond to the pairwise potential differences $u_{RS,Umr}$, $u_{ST,Umr}$, $u_{TR,Umr}$ between lines R, S, T of the three-phase power supply. The threshold value $\Delta u_{lim}$ can be defined in principle individually for the individual line-to-line power supply voltages $u_{RS,Umr}$, $u_{ST,Umr}$, $u_{TR,Umr}$ as $\Delta u_{limDCRS}$, $\Delta u_{limDCST}$, $\Delta u_{limDCTR}$.

In this case, the term continuously encompasses both a permanent, time-continuous, for example analog, measurement, determination and observation of the individual parameters and a measurement, determination and observation of the individual parameters for example using digital monitoring and control methods in time-discrete steps.

Starting the normal fundamental frequency clocking enables a generator power flow from the intermediate circuit into the three-phase power supply.

If the fundamental frequency clocking is stopped, then the converter operates as a simple passive diode bridge. Limiting cycles can furthermore be avoided by employing a hysteresis.

Preferably, the threshold value $\Delta u_{lim}$ is on the one hand chosen to be small enough such that when the fundamental frequency clocking is started, no overcurrent arises on account of an excessively large driving voltage, and in that the threshold value is on the other hand chosen to be large enough such that the fundamental frequency clocking is not started on account of, for example, measurement noise or system oscillations.

By way of example, if use is made of a sensor system for intermediate circuit voltage and power supply current and for fast overcurrent detection and fast overcurrent feedback to the semiconductor switch driving, then it is conceivable to carry out the method according to the invention as follows:
- continuously measuring the intermediate circuit voltage $u_{DC}$,
- continuously determining and observing the power supply active current $I_w$,
- continuously determining and observing a smoothed mean value $\bar{I}_w$ of the power supply active current $I_w$,
- comparing the intermediate circuit voltage $u_{DC}$ with a threshold value $u_{DClim}$, and
- starting the fundamental frequency clocking of the semiconductor switches if the intermediate circuit voltage $u_{DC}$ exceeds the threshold value $u_{DClim}$, and
- stopping the fundamental frequency clocking of the semiconductor switches if the smoothed mean value $\bar{I}_w$ of the power supply active current $I_w$ changes its sign again.

In this case, the continuous measurement, determination and observation of the individual parameters can likewise be effected using digital monitoring and control methods in time-discrete steps.

Preferably, in this case, when a converter circuit specific maximum current threshold is reached, the affected semiconductor switch is switched off, and is switched on again only when the current has subsided to a sufficient extent.

If the threshold value for the intermediate circuit voltage as of which the fundamental frequency clocking is started is set e.g. to the maximum permissible power supply voltage of $$\sqrt{2} \cdot u_{power\,supply,max}$$

and if the intermediate circuit voltage exceeds said threshold value on account of energy being fed into the intermediate circuit, then the voltage difference between three-phase power supply and intermediate circuit is generally so large that an opening of a current path for a time duration of an order of magnitude of $10^{-3}$ s, as is carried out during the fundamental frequency clocking, would already to an overcurrent and thus to a protective shutdown of the converter. According to the invention, therefore, when a converter circuit specific maximum current threshold is reached, the affected semiconductor switch is switched off very rapidly, for instance of an order of magnitude of $10^{-6}$ s. If the current has subsided to a sufficient extent, then the affected semiconductor switch is switched on again and the current can rise again. This results in the basic behavior of a so-called two-point regulator which realizes a power supply current at the power limit of the converter. This two-point behavior is superposed on the fundamental frequency clocking until the voltage difference between the intermediate circuit and the three-phase power supply has subsided to an extent such that it no longer brings about overcurrents.

By way of example, if use is made of a sensor system for intermediate circuit voltage and power supply and/or intermediate circuit current, then it is conceivable to carry out the method according to the invention in such a way that the semiconductor switches are clocked under no load or under low motor load with test signals which

- are compatible with the fundamental frequency switching pattern in normal operation,
- considerably reduce the required apparent power under no load in comparison with normal operation,
- automatically track the intermediate circuit voltage upon a decrease in the power supply voltage under no load, and
- supply a criterion for starting and for ending the fundamental frequency normal operation through evaluation of the remaining apparent power under no load or under low motor load.

In this case, it is conceivable that the semiconductor switches are turned off by the test signals periodically alternately during no load or during a low motor loading in pairs or individually in each case during an individual limited angular range of a power supply angle, and are otherwise turned off, and exhibit the behavior of pure diode bridges. In this case, the limited angular range is smaller than the normal 60° sector of the fundamental frequency clocked operation and comprises for example a segment of such a sector.

Preferably, the position of the individual angular ranges is chosen such that the current path is opened only when the difference $\Delta u$ between intermediate circuit voltage $u_{DC}$ and line-to-line power supply voltage $u_v$ is small.

Preferably, in this case, the fundamental frequency clocking is started when a threshold value for the active current is exceeded.

An advantageous configuration of the invention relates to a converter comprising controllable semiconductor switches for carrying out the method described above, which converter comprises

- means for continuously detecting and/or determining the direction of an instantaneous power flow,
- means for comparing the direction of the detected and/or determined power flow with a desired direction of the power flow,
- means for starting and stopping the fundamental frequency clocking of the semiconductor switches ($T_1$, $T_2$, $T_3$, $T_4$, $T_5$, $T_6$) in a manner dependent on the desired direction of the power flow.

A particularly advantageous configuration of the converter according to the invention comprises means for turning off individual semiconductor switches during individual limited angular ranges ($\{\Phi_1 \ldots, \ldots, \Phi_2\}$) of a power supply angle ($\Phi$) under no load or during low motor loading.

Preferably, the semiconductor switches of the converter used for carrying out the method described above are embodied as insulated gate bipolar transistors (IGBTs).

BRIEF DESCRIPTION OF THE DRAWING

The invention is explained below with reference to the drawings, in which.

DETAILED DESCRIPTION FO PREFERRED EMBODIMENTS

Figure 2:
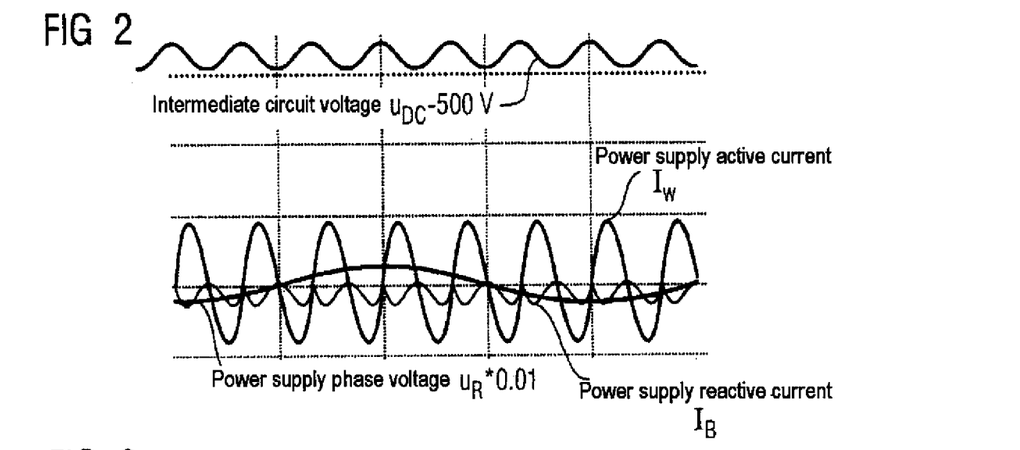
FIG. 2 shows the voltage and current profile of the converter which is operated in fundamental frequency clocked fashion, is connected to a 400 V three-phase power supply, and is illustrated in FIG. 1, under no load, where $L_c$=1 mH, $C_{DC}$=2 mF.

For the preferred solution route, a transformation of the three-phase power supply current into its active component and into its reactive component is used as illustrated schematically in FIG. 2. The representation of the currents and voltages as space vectors is chosen for this purpose. The space vector $x_{\alpha\beta}$ in the $\alpha$-$\beta$ coordinate system results from the components of the phases R, S, T—phase components hereinafter—as follows:

$$x_{\alpha\beta} = x_\alpha + jx_\beta = \begin{bmatrix} x_\alpha \\ x_\beta \end{bmatrix} = \frac{2}{3} \begin{bmatrix} 1 & -\frac{1}{2} & -\frac{1}{2} \\ 0 & \frac{\sqrt{3}}{2} & -\frac{\sqrt{3}}{2} \end{bmatrix} \begin{bmatrix} x_R \\ x_S \\ x_T \end{bmatrix}. \quad (a)$$

This definition applies both to the space vector $u_{\alpha\beta}$ of the power supply voltages $u_R$, $u_S$, $u_T$ and to the current space vector $i_{\alpha\beta}$ of the phase currents $i_R$, $i_S$, $i_T$, where x in equation (a) is replaced by u and i, respectively. The time dependence is not explicitly incorporated in this case. The space vector $i_{\alpha\beta}$ rotates with the power supply frequency about the origin of the $\alpha$-$\beta$ coordinate system. Transformation into a coordinate system which rotates with the power supply frequency yields the steady-state vector $$i_{pq} = i_p + ji_q = \begin{bmatrix} i_p \\ i_q \end{bmatrix} = \begin{bmatrix} \cos\gamma & \sin\gamma \\ -\sin\gamma & \cos\gamma \end{bmatrix} \begin{bmatrix} i_\alpha \\ i_\beta \end{bmatrix}. \quad (b)$$

The p component is designated as the active component, and the q component is designated as the reactive component of the power supply current. The p-q coordinate system is rotated by the time-variant angle $-\gamma$ relative to the $\alpha$-$\beta$ coordinate system. The angle $\gamma$ is by definition chosen such that the space vector $u_{\alpha\beta}$ of the power supply voltage source coincides with p axis, such that the power supply voltage source defines the active axis.

The active power $P_W$ is defined as the mean value of the power over a power supply period T in accordance with $$P_W = \frac{1}{T} \int_0^T u(t)i(t)\,dt. \qquad (c)$$

The designations power supply active current $I_W = i_p$ and power supply reactive current $I_B = i_b$ for the instantaneous values of the current arise below through strict application of the abovementioned transformation in accordance with equation (b). On account of the periodicity of $I_W$, an active power different than zero is not necessarily associated with this, however, in accordance with equation (c).

Figure 3:
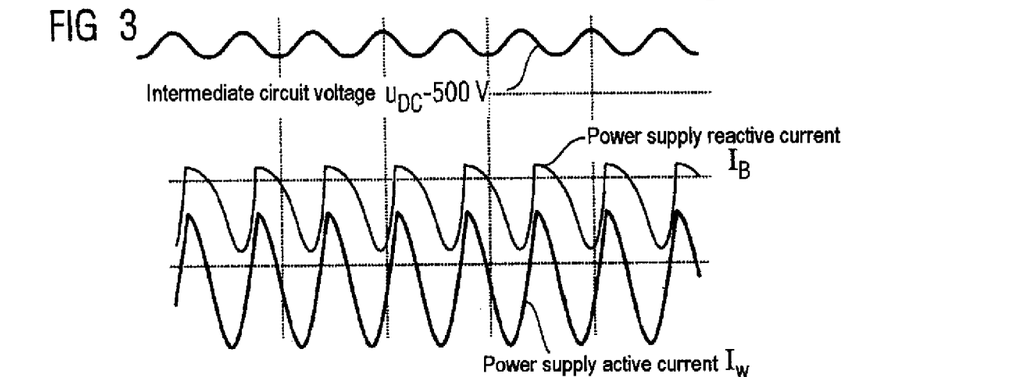
FIG. 3 shows the voltage and current profile of the converter which is operated in fundamental frequency clocked fashion, is connected to a 400 V three-phase power supply, and is illustrated in FIG. 1, under motor loading, where $L_c$=1 mH, $C_{DC}$=2 mF.

The oscillating current which occurs in the case of a converter 1 which is connected to a three-phase power supply 3 and is illustrated in FIG. 1 and described in the introduction and serves for regulating an intermediate circuit 2 under no load and with low motor loading arises during the fundamental frequency clocking as a result of the discharging and charging processes of the intermediate circuit capacitor $C_{DC}$. In this case, the intermediate circuit voltage approximately follows the fluctuation of the line-to-line power supply voltage $u_v$ since, with the fundamental frequency driving of the IGBTs $T_1, \ldots, T_6$, a power flow can be effected both from the three-phase power supply 3 into the intermediate circuit 2 and in the opposite direction. With increasing motor loading, that is to say an active power drawing of the intermediate circuit 2, the oscillating power originating from the fundamental frequency clocking decreases. The power supply active current $I_w$ then no longer experiences cyclic sign changes, such that the actually undesirable discharging of the intermediate circuit capacitor $C_{DC}$ into the three-phase power supply 3 does not occur. On account of the active power drawing from the intermediate circuit 2, the mean value of the intermediate voltage $u_{DC}$ decreases and, accordingly, there is a decrease in the voltage difference $\Delta u$ for the discharging of the intermediate circuit capacitor $C_{DC}$ into the three-phase power supply 3. The remaining fluctuation—illustrated in FIG. 3—of the power supply current with strong motor loading of the converter is a system property of the B6 diode bridge contained in the converter 1 and comprising the IGBTs $T_1, \ldots, T_6$.

Proceeding from the explanations above, the idea on which the invention is based is to use a converter circuit which enables both an active feeding-in/feedback power flow and a purely passive operation in a line direction. A preferred circuit is the IGBT B6 bridge illustrated in FIG. 1 and comprising a passive parallel diode bridge.

According to the invention, the IGBTs $T_1, \ldots, T_6$ preferably used for the power flow from the intermediate circuit 2 into the three-phase power supply 3 are driven in fundamental frequency clocked fashion in principle only when active power $I_w$ is actually intended to be fed into the three-phase power supply 3. According to the invention, the fundamental frequency clocking of the semiconductor switches preferably embodied as IGBTs is thus dependent on the desired direction of the power flow.

The way of determining the desired direction of the power flow and hence the precise fashioning of the criteria for switching the fundamental frequency clocking on and off are dependent on the various system components.

In this case, three variants are conceivable, in principle:

Variant A: sensor system for power supply voltage, intermediate circuit voltage and also power supply and/or intermediate circuit current:

In this case, the power supply voltages, for example the phase voltages $u_R$, $u_S$, $u_T$ or the conductor voltages, and also the intermediate circuit voltage $u_{DC}$ are measured. If the difference $\Delta u$ between intermediate circuit voltage $u_{DC}$ and a line-to-line power supply voltage $u_v$, for example $U_{RS}$, $U_{mr}$, exceeds a positive threshold value $\Delta u_{lim}$, for example $\Delta u_{lim,DcRS}$, in accordance with $$\Delta u = u_{DC} - u_{RS,Umr} > \Delta u_{lim,DcRS}$$

then the intermediate circuit voltage $u_{DC}$ has risen on account of a power flow into the intermediate circuit 2. Starting the normal fundamental frequency clocking of the IGBTs $T_1, \ldots, T_6$ enables a generator power flow from the intermediate circuit 2 into the three-phase power supply 3. In this case, the threshold value $\Delta u_{lim}$ on the one hand has to be chosen to be small enough such that no overcurrent on account of an excessively large driving voltage arises when the fundamental frequency clocking is started. On the other hand, the threshold value $\Delta u_{lim}$ has to be chosen to be large enough in order that the criterion for starting the fundamental frequency clocking does not respond on account of measurement noise or system oscillations. The fundamental frequency clocking is stopped if the smoothed mean value $\bar{I}_w$ of the power supply active current $I_w$ changes its sign again and thus indicates the motor operating case. The converter 1 then operates as a simple passive diode bridge. Limiting cycles can be avoided by employing a hysteresis.

Variant B: sensor system for intermediate circuit voltage and power supply current and also fast overcurrent detection and fast overcurrent feedback to the IGBT driving:

In this case, the intermediate circuit voltage $u_{DC}$ is measured. If the intermediate circuit voltage $u_{DC}$ exceeds a threshold value $u_{DClim}$ on account of energy being fed into the intermediate circuit 2, then the fundamental frequency clocking of the IGBTs $T_1, \ldots, T_6$ of the converter 1 is started. The operation is similar to so-called chopper operation. The threshold value $u_{DClim}$ is set for example to the voltage value that can be achieved at a maximum permissible power supply voltage $u_{power\ supply,\ max}$ under no load $$\sqrt{2} \cdot u_{power\ supply,max}$$

such that $$u_{DC} > u_{DC\ lim} > \sqrt{2} \cdot u_{power\ supply,max}$$

holds true as a criterion for starting the fundamental frequency clocked operation. In general, then, the voltage difference between three-phase power supply 3 and intermediate circuit 2 is so large that an opening of a current path for a time duration of an order of magnitude of $10^{-3}$ s, as is carried out during the fundamental frequency clocking, would already lead to an overcurrent and thus to a protective shut-down of the converter. According to the invention, therefore, when a converter circuit specific maximum current threshold is reached, the affected IGBT switch is switched off very rapidly, for instance of an order of magnitude of $10^{-6}$ s. If the current has subsided to a sufficient extent, then the affected IGBT is switched on again and the current can rise again. This results in the basic behavior of a so-called two-point regulator which realizes a power supply current at the power limit of the converter 1. This two-point behavior is superposed on the fundamental frequency clocking until the voltage difference between the intermediate circuit 2 and the three-phase power supply 3 has subsided to an extent such that it no longer brings about overcurrents. The fundamental frequency clocking is stopped if the smoothed mean value $\bar{I}_w$ of the power supply active current $I_w$ changes its sign again and thus indicates the motor operating case. The converter 1 then operates as a simple passive diode bridge. Limiting cycles can be avoided by employing a hysteresis.

Variant C: sensor system for intermediate circuit voltage and power supply and/or intermediate circuit current:

This solution requires a minimal outlay on hardware and therefore represents a preferred exemplary embodiment of the invention. It is therefore explained in great detail below.

The starting point for the considerations concerning C. is the deactivation—sought under no load of the converter 1 operated at fundamental frequency—of the IGBTs $T_1, \ldots, T_6$ with the resultant reduction of the required apparent power that can be obtained.

In the case of a small power feed and resultant slow rise of $u_{DC}$ or as a result of a slow decrease in the power supply voltage, a large voltage difference between the amplitude of the line-to-line power supply voltage $u_{RST,Umr}$ and the intermediate circuit voltage $u_{DC}$ can build up in the no load range. Without measuring the power supply voltage, as described under A., the voltage difference initially cannot be identified and leads, when the fundamental frequency IGBT operation is subsequently started, without additional measures, such as those described under B., for example, to overcurrents and hence to shutdowns.

The basic idea of variant C., then, is for the IGBTs $T_1, \ldots, T_6$ not to be fully turned off under no load, but rather for a type of test signals to be output which
- are compatible with the fundamental frequency switching pattern in normal operation,
- considerably reduce the required apparent power under no load in comparison with normal operation,
- automatically track the intermediate circuit voltage upon a decrease in the power supply voltage under no load, and
- supply a criterion for starting and for ending the fundamental frequency normal operation through evaluation of the remaining apparent power in the range of no load.

Figure 4:
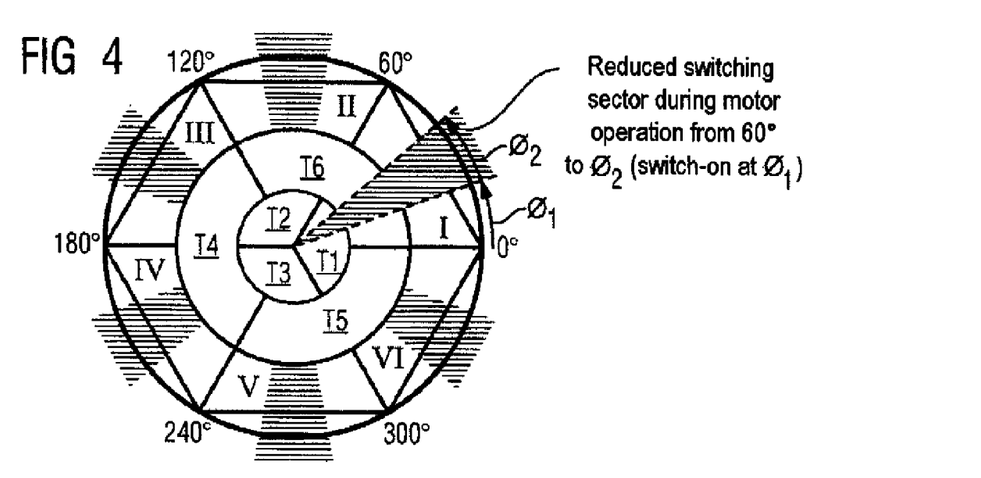
FIG. 4 shows a switching pattern according to the invention for driving the semiconductor switches of the converter illustrated in FIG. 1.

A preferred switching pattern for the test signals is illustrated in FIG. 4. In this case, FIG. 4 shows the control logic of the semiconductor switches $T_1$ to $T_6$ in fundamental frequency clocked operation for a power supply period of 0° to 360°. In this case, "fundamental frequency" is understood to mean that the semiconductor switches $T_1$ to $T_6$ are driven in their individual angular ranges permanently, for example by driving with a direct-current switching signal, or at least predominantly, for example by driving with a high-frequency switching signal.

Normally, at the boundaries of the 60° sectors I, II, III, IV, V, VI of the power supply angle $\Phi$, in each case one semiconductor switch $T_1, T_2, T_3, T_4, T_5, T_6$ is switched off and another semiconductor switch $T_1, T_2, T_3, T_4, T_5, T_6$ is switched on. A further semiconductor switch $T_1, T_2, T_3, T_4, T_5, T_6$ remains driven at the respective boundary between the sectors I, II, III, IV, V, VI, and all the other semiconductor switches $T_1, T_2, T_3, T_4, T_5, T_6$ are open. The closing of the semiconductor switches $T_1, T_2, T_3, T_4, T_5, T_6$ is then shifted by the angle $\Phi_1$ and shortened to the angular range $\Phi_2$ in each sector I, II, III, IV, V, VI, shown for the sector I in the illustration in FIG. 4. The semiconductor switches $T_1, T_2, T_3, T_4, T_5, T_6$ are then only driven in each case in the hatched segments. For all other times or power supply angles, all the semiconductor switches $T_1, T_2, T_3, T_4, T_5, T_6$ are open and the behavior of a pure diode bridge is obtained.

The method according to the invention according to C. brings about a reduction of the switching duration during motor operation. On the basis of the example of the first sector I, it can be gathered from FIG. 4 that a switch-on of T1/T6 takes place only at $\Phi_1$, and switch-off of T1/T6 takes place at $\Phi_1+\Phi_2$.

It is important to emphasize that other forms are also expedient for the test signals, for example a division of the segments proposed into small subranges.

The background for the choice of the form of the test signals is for the current path required for the respective switching sector to be opened only when the difference voltage $$\Delta u = u_{DC} - u_{RS,Umr}$$

between intermediate circuit and three-phase power supply is small.

Figure 5:
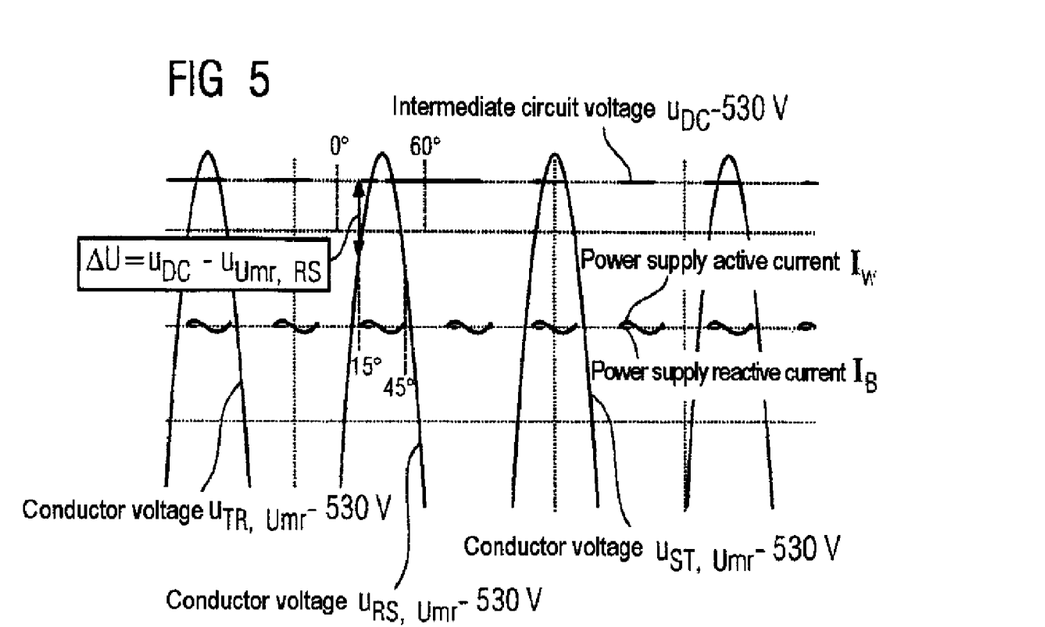
FIG. 5 shows a schematic illustration of the resulting active and reactive currents of a converter operated at fundamental frequency with a switching sector ($x_1$=15°) reduced according to the invention at the 400 V power supply under no load, where $L_c$=1 mH, $C_{DC}$=2 mF.
Figure 6:
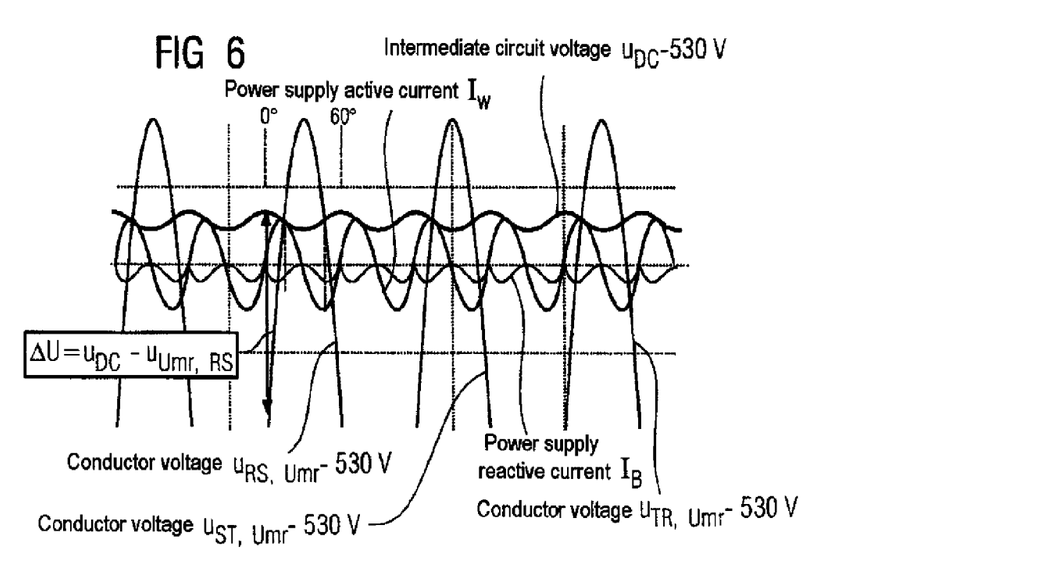
FIG. 6 shows a schematic illustration of the resulting active and reactive currents of a converter operated at fundamental frequency with a standard switching sector at the 400 V power supply under no load, where $L_c$=1 mH, $C_{DC}$=2 mF.

The reduction of the active and reactive current loading at the no load point which can be achieved by means of the method according to the invention can be gathered from a comparison of the resulting active and reactive currents illustrated in FIG. 5 and FIG. 6 at no load for a switching range (FIG. 5)—reduced according to the invention according to variant C.—of the semiconductor switches of a converter and also a switching range—corresponding to the prior art—of the semiconductor switches of the same converter.

Figure 7:
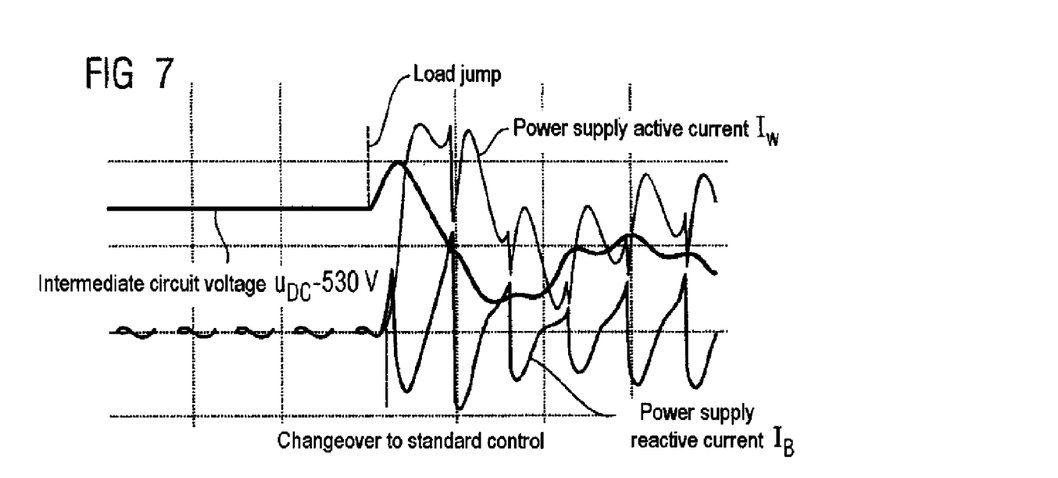
FIG. 7 shows a schematic illustration of a load jump from no load to feedback operation with changeover owing to the exceeding of a generator current threshold from reduced switching sector to fundamental frequency standard operation for full feedback power.

In the case of a highly dynamic generator loading of the intermediate circuit, the normal full sector operation must be activated within a short time since otherwise the power cannot be fed back into the power supply and the intermediate circuit voltage would rise up to the shutdown limit or high overcurrents would occur on account of the high difference voltage with respect to the power supply. FIG. 7 illustrates such a changeover process. The exceeding of a threshold for the active current is preferably manifested as a start condition for the normal 60° operation.

Figure 8:
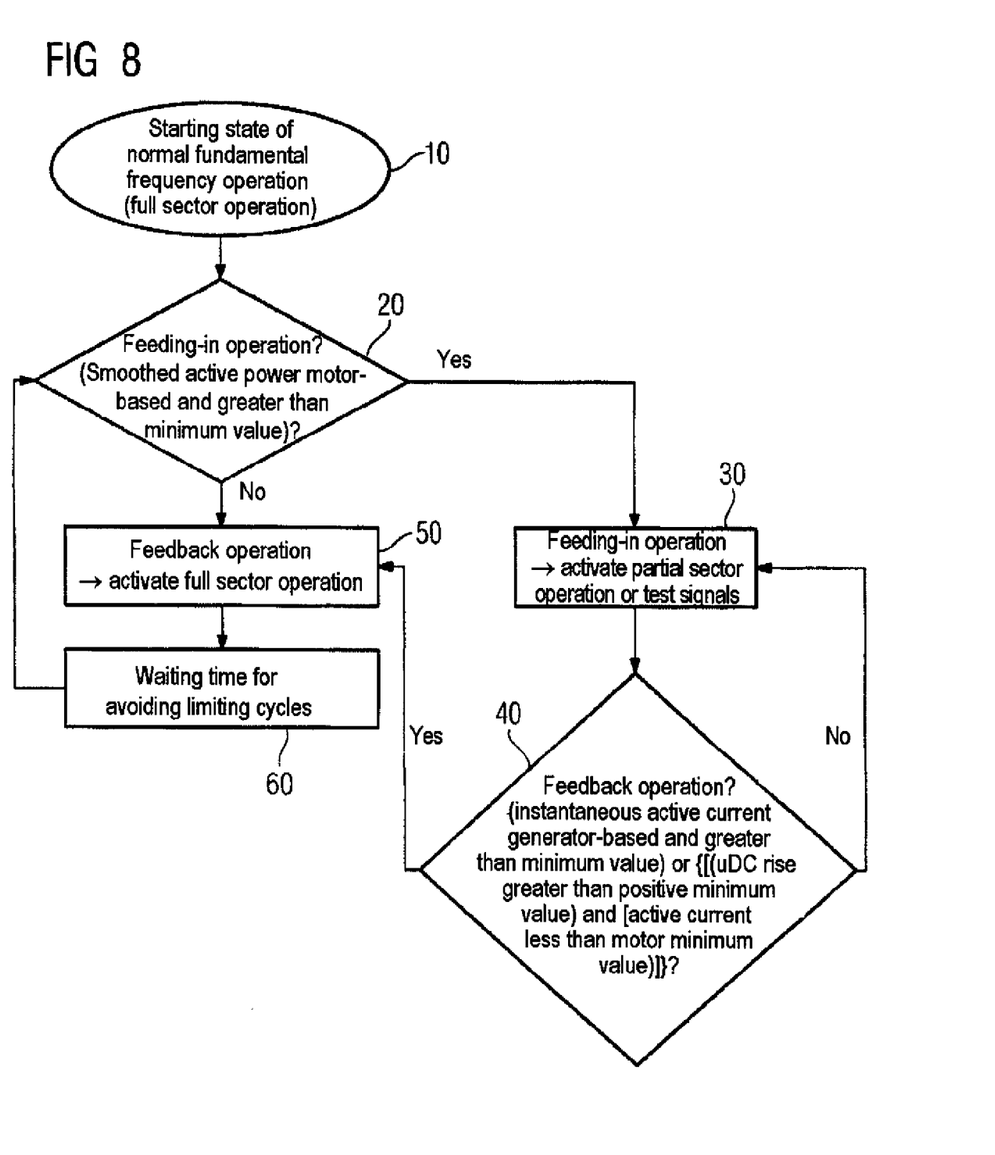
FIG. 8 shows a flowchart for the changeover between normal full sector operation and partial sector operation according to the invention for reducing the apparent power at the no load point and with weak motor loading.

A possible algorithm for changing over between the normal fundamental frequency operation for feedback and a test signal operation according to the invention with a reduced switching sector according to variant C. is illustrated in FIG. 8.

Proceeding from a starting state 10, in which the converter is operated normally in fundamental frequency clocked fashion, a first method step 20 involves checking whether or not feeding-in operation takes place. This is done for example by considering the smoothed active power and comparing the latter with a minimum value.

If feeding-in operation is ascertained in method step 20, then partial sector operation according to C. is activated by activation of the test signals in a further method step 30.

Then, proceeding from feeding-in operation, continuously, for example in time-discrete steps, by means of a computer-controlled monitoring unit, a method step 40 involves checking whether or not feedback operation is present. This checking takes place for example by comparing the instantaneous generator active current with a minimum value or by observing the rise in the intermediate circuit voltage $u_{DC}$ and comparing this rise with a minimum value, and by comparing the active current $I_w$ with a minimum value.

If feedback operation cannot be ascertained, steps 30 and 40 are repeated until feedback operation can be ascertained.

If feedback operation is ascertained, then, in a method step 50, full sector operation is activated, and the converter is again operated in fundamental frequency clocked fashion.

A waiting cycle 60 following method step 50 serves to avoid limiting cycles before the method is continued with method step 20.

If feeding-in operation cannot be ascertained in method step 20, then method steps 50 and 60 are repeated until feeding-in operation can be ascertained.

It is important to emphasize that the method according to the invention described here makes it possible to considerably reduce the apparent power of a fundamental frequency clocked converter at the no load point and with motor partial load. An energy saving and hence cost saving for the user can be achieved to a considerable extent as a result of this. The method according to the invention furthermore has a direct effect on the dimensioning of the power supply connection for the user and thus enables considerable cost savings. Furthermore, the significant reduction of the oscillating currents results in a higher acceptance of fundamental frequency operation for the user.

Moreover, the method according to the invention
results in an on average reduced thermal loading of the converter and the additional components.
Does not require an increase in the switching frequency of the semiconductor switches for the test signal operation.

Furthermore, the method according to the invention and a converter for carrying out the method according to the invention can be realized cost-effectively since there is no additional component outlay or manufacturing outlay on the part of the converter in comparison with the prior art. Consequently, the method according to the invention is compatible with the previous implementation of the fundamental frequency operation.

What is claimed is:

1. A method for reducing reactive power requirement of a mains-side converter equipped with controllable semiconductor switches, the method comprising:
    clocking the semiconductor switches with test signals under no-load conditions or with a small motor load at a fundamental frequency depending on a desired direction of power flow, wherein the test signals are selected to
    be compatible with a switching pattern at the fundamental frequency in normal operation,
    significantly reduce a required apparent power under no-load conditions in comparison with normal operation,
    automatically track an intermediate circuit voltage if a mains voltage decreases under no-load conditions, and
    supply a criterion for starting and stopping normal operation at the fundamental frequency by evaluating a remaining apparent power under no-load conditions or with a small motor load.

2. The method of claim 1, wherein the semiconductor switches are periodically and alternately turned off by the test signals during a no-load condition or with a small motor load, either in pairs or individually, when a mains phase angle is positioned in an individual limited angular range, while otherwise being turned on.

3. The method of claim 2, wherein a position of the individual limited angular range is selected so that a current path is opened when a difference between the intermediate circuit voltage and a phase-to-phase mains voltage is small.

4. The method of claim 2, wherein clocking at the fundamental frequency is started when an active current exceeds a threshold value.

5. The method of claim 1, further comprising the steps of:
    continuously measuring voltages of a three-phase power mains connected to the converter and at least one phase-to-phase mains voltage,
    continuously measuring the intermediate circuit voltage of an intermediate circuit connected to the converter,
    continuously measuring and monitoring a mains active current and a smoothed average value of the mains active current,
    continuously measuring and monitoring a difference between the intermediate circuit voltage and the at least one phase-to-phase mains voltage, and comparing the measured difference with a positive threshold value,
    starting clocking the semiconductor switches at the fundamental frequency if the measured difference exceeds the threshold value, and
    stopping clocking the semiconductor switches at the fundamental frequency if the smoothed average value of the mains active current changes polarity.

6. The method of claim 5, wherein the threshold value is selected to be small enough so as to prevent an overcurrent at the start of clocking if a drive voltage is excessive, while still being large enough so as to prevent measurement noise or system oscillations from starting clocking.

7. The method of claim 1, further comprising the steps of:
    continuously measuring the intermediate circuit voltage,
    continuously measuring and monitoring a mains active current and a smoothed average value of the mains active current,
    comparing the intermediate circuit voltage with a threshold value,
    starting clocking the semiconductor switches at the fundamental frequency if the intermediate circuit voltage exceeds the threshold value, and
    stopping clocking the semiconductor switches at the fundamental frequency if the smoothed average value of the mains active current changes polarity.

8. The method of claim 7, wherein a semiconductor switch is switched off when reaching a converter-circuit-specific maximum current threshold, and wherein the semiconductor switch is switched on again when the current has sufficiently decreased below the maximum current threshold.

9. A converter, comprising:
    a plurality of controllable semiconductor switches,
    means for continuously measuring or determining a direction of an instantaneous power flow,
    means for comparing the direction of the measured or determined instantaneous power flow with a desired direction of the power flow,
    means for applying test signals to the semiconductor switches for clocking the semiconductor switches at a fundamental frequency depending on the desired direction of the power flow,
    wherein the test signals are selected to
    be compatible with a switching pattern at the fundamental frequency in normal operation,
    significantly reduce a required apparent power under no-load conditions in comparison with normal operation,
    automatically track an intermediate circuit voltage if a mains voltage decreases under no-load conditions, and
    supply a criterion for starting and terminating normal operation at the fundamental frequency by evaluating a remaining apparent power under no-load conditions or with a small motor load.

10. The converter of claim 9, wherein the means for applying test signals to the semiconductor switches are configured to turn off semiconductor switches during an individual limited angular range of a mains phase angle during a no-load condition or with a small motor load.

11. The converter of claim 9, wherein the semiconductor switches comprise insulated gate bipolar transistors (IGBTs).

* * * * *